United States Patent
Johnson et al.

(10) Patent No.: US 10,634,268 B1
(45) Date of Patent: Apr. 28, 2020

(54) METHOD AND APPARATUS FOR MULTIDIRECTIONAL PIPE RUNNERS

(71) Applicant: CCI Piping System, LLC, Breaux Bridge, LA (US)

(72) Inventors: Lucas Johnson, Duson, LA (US); Patrick Sullivan, Scott, LA (US); Jake Hardy, Arnaudville, LA (US)

( * ) Notice: Subject to any disclaimer, the term of this patent is extended or adjusted under 35 U.S.C. 154(b) by 63 days.

(21) Appl. No.: 15/946,497

(22) Filed: Apr. 5, 2018

Related U.S. Application Data

(60) Provisional application No. 62/482,502, filed on Apr. 6, 2017.

(51) Int. Cl.
| | | |
|---|---|---|
| *F16L 9/19* | (2006.01) | |
| *F16L 39/00* | (2006.01) | |
| *B23P 19/04* | (2006.01) | |

(52) U.S. Cl.
CPC ............. *F16L 9/20* (2013.01); *F16L 39/005* (2013.01); *B23P 19/04* (2013.01)

(58) Field of Classification Search
CPC .......... F16L 19/20; F16L 19/04; F16L 39/005
USPC .......................... 138/112, 113, 114, 110, 106
See application file for complete search history.

(56) References Cited

U.S. PATENT DOCUMENTS

| | | | | |
|---|---|---|---|---|
| 1,122,130 A | * | 12/1914 | Lamson | H01B 12/14 138/113 |
| 2,531,658 A | * | 11/1950 | Walsh | F16L 59/12 138/101 |
| 2,706,496 A | | 4/1955 | Bond | |
| 3,379,027 A | * | 4/1968 | Mowell | F16L 3/18 62/50.7 |
| 3,725,567 A | * | 4/1973 | Olsen | H02G 5/066 174/16.2 |
| 3,739,074 A | | 6/1973 | Floessel | |
| 3,786,379 A | * | 1/1974 | Lutchansky | H01P 1/00 333/248 |
| RE31,949 E | * | 7/1985 | Hopkins | H02G 5/066 174/14 R |
| 4,743,709 A | * | 5/1988 | Meyer | H02G 5/066 174/28 |
| 5,028,019 A | * | 7/1991 | Hardtke | F16L 3/18 248/49 |
| 5,503,191 A | | 4/1996 | Morris | |
| 5,575,590 A | * | 11/1996 | Drost | F16L 1/163 405/166 |
| 5,791,380 A | | 8/1998 | Onan et al. | |
| 6,003,559 A | | 12/1999 | Baker | |

(Continued)

OTHER PUBLICATIONS

Advance Products & Systems, LLC, "New ApogeeAero® Anti-Corkscrewing Roller Casing Spacers"; 6 pages; Lafayette, LA; "Rev 091218".

*Primary Examiner* — Craig M Schneider
*Assistant Examiner* — David R Deal
(74) *Attorney, Agent, or Firm* — Ted M. Anthony

(57) ABSTRACT

A multidirectional runner assembly for positioning a carrier pipe within a surrounding casing pipe. Each multidirectional runner assembly has at least one ball transfer assembly at least partially protruding from the runner assembly, in order to contact an inner surface of a surrounding casing pipe. The ball transfer assemblies reduce static and/or kinetic friction forces during installation of a carrier pipe within the central bore of a casing pipe, permit multidirectional orientation of the runners within the casing pipe, and provide greater load support.

12 Claims, 4 Drawing Sheets

(56) References Cited

U.S. PATENT DOCUMENTS

| | | | |
|---|---|---|---|
| 6,926,257 B1 | 8/2005 | Alcantara | |
| 7,225,837 B1 * | 6/2007 | Kane | F16L 7/00 |
| | | | 138/108 |
| 9,546,745 B2 * | 1/2017 | Costa | F16L 3/18 |
| 2003/0201025 A1 * | 10/2003 | Calais | F16L 7/00 |
| | | | 138/112 |
| 2008/0145151 A1 * | 6/2008 | Rodrigue | F16L 1/20 |
| | | | 405/184.4 |

* cited by examiner

METHOD AND APPARATUS FOR MULTIDIRECTIONAL PIPE RUNNERS

CROSS REFERENCES TO RELATED APPLICATION

This application claims priority of U.S. Provisional Patent Application Ser. No. 62/482,502, filed Apr. 6, 2017, incorporated herein by reference.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention pertains to pipe runner assemblies having friction reducing elements. More particularly, the present invention pertains to multidirectional pipe runners, capable of being mounted to pipe bodies, having friction reducing element disposed in said runners. More particularly still, the present invention pertains to pipe runners having ball transfer assemblies, allowing carrier pipe (and runners) to roll through surrounding casing pipe instead of merely sliding through said surrounding pipe.

2. Brief Description of the Prior Art

In many conventional piping systems, an outer casing pipe is frequently utilized as a conduit for containing some part of at least one carrier pipe; said at least one carrier pipe can be installed within a central through bore of said outer casing pipe or conduit. Among other benefits, said casing pipe guides installation of said carrier pipe through subterranean strata or other surroundings. Such casing pipe can also serve to insulate and protect the carrier pipe(s) contained within said casing pipe from external environmental forces or harmful materials.

Frequently, so-called "casing runners" are affixed to the outer surface of a carrier pipe. Said runners typically extend radially outward from said outer surface of said carrier pipe, and are used to keep carrier pipes in a desired position or alignment within a central through bore of said surrounding casing pipe. In the case of gravity flow lines, said runners can be used to maintain the carrier pipe at a desired grade or position along the length of a surrounding casing pipe. Said runners can also act as spacers or centralizers, forming a "stand-off" distance or annular space between the outer surface of the carrier pipe(s) and the inner surface of the surrounding casing pipe.

Although other configurations can be utilized, said pipe runners typically comprise elongate fins or blade-like extensions that are oriented substantially parallel to the longitudinal axis of said carrier pipe. Further, said pipe runners are grouped together in spaced relationship at multiple predetermined positions along the length of the carrier pipe(s), and are disposed in desired phasing around the outer circumference of said carrier pipe(s).

During installation of a carrier pipe within an outer casing pipe, said carrier pipe (along with attached runners) typically must slide through the central bore of said surrounding casing pipe. When sliding said carrier pipe through said central bore of said casing pipe, frictional forces generated between the outer surfaces of said runners and the inner surface of the casing pipe can make such installation more difficult, particularly with larger carrier pipes. Such frictional forces can require significant force to "push" carrier pipe(s), particularly over long distances; when such frictional force reaches a certain threshold, the carrier pipe (and attached runners) can stop advancing within the casing pipe, and can even "corkscrew" within the central bore of a casing pipe as force continues to be applied to said carrier pipe.

Such frictional forces can also cause runners to abrade and/or wear away, particularly runners that are made of polymer, thermoplastic resin or other synthetic material. The amount of such wear of said runners is generally dependent on the weight of the carrier pipe, as well as the length or distance of the installation. Excessive wear on said runners can impact or change the size and shape of the runners and, thus, the configuration of an installation. As a result, the use of runners can frequently negatively impact installations and/or project configurations due to the existence of such frictional forces.

Unidirectional rollers have been installed on runners to aid with such installation. Generally, such roller assemblies comprise a roller disposed within a channel formed in at least one outwardly facing surface of a runner. Such roller assemblies can lessen the effect of frictional forces acting on the runners, particularly during installation operations. However, when not mounted correctly, conventional unidirectional rollers can cause carrier pipe to spiral within the central through bore of casing pipe. Further, the carrier pipe can eventually tip over from the rollers riding up the internal surfaces of the casing.

Thus, there is a need for a pipe runner that reduces frictional forces, particularly during installation operations within a casing pipe. Said pipe runner should allow for multidirectional friction reduction.

SUMMARY OF THE INVENTION

The present invention comprises a multidirectional runner assembly for use on carrier pipe including, without limitation, carrier pipe installed within a central through bore of a surrounding casing pipe. The multidirectional runner assembly of the present invention, which solves problems commonly encountered with conventional unidirectional roller systems, significantly reduces frictional forces acting on said runner assemblies during installation of carrier pipe within surrounding casing pipe. Installation of carrier pipe equipped with the multidirectional runner assembly of the present invention is faster and requires less force to move/drive said carrier pipe within the bore of a surrounding casing pipe.

The multidirectional runner assembly of the present invention comprises at least one ball transfer assembly that reduces frictional forces, and thus eliminates runner wear, allowing longer pipe installation distances. Said at least one ball transfer assembly enables runners to have multidirectional movement along virtually any axis. Further, said ball transfer assemblies keep said carrier pipe centered due to gravity and the weight of the carrier pipe which prevents said carrier pipe from tipping over or spiraling in said casing pipe during installation.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 1 depicts an exploded end view of a first embodiment of a multidirectional runner assembly of the present invention.

FIG. 2 an exploded end view of a second embodiment of a multidirectional runner assembly of the present invention.

DETAILED DESCRIPTION OF A PREFERRED EMBODIMENT

Figure 1:
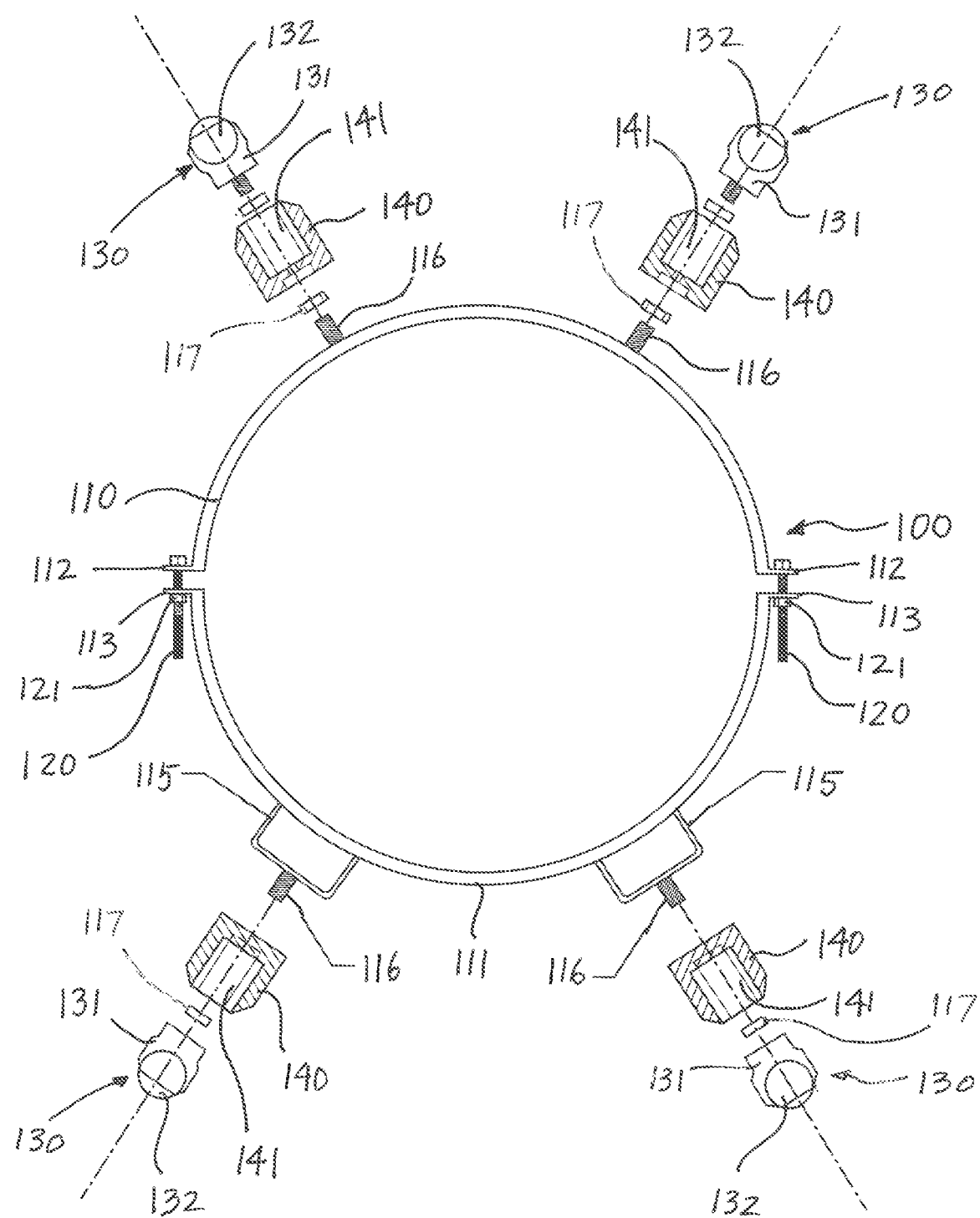

FIG. 1 depicts an exploded end view of a first embodiment of a multidirectional runner assembly 100 of the present invention. In a preferred embodiment, said multidirectional runner assembly comprises a band assembly that can be installed around the outer circumferential surface of a length of a pipe (such as, for example, a carrier pipe to be installed within a casing pipe).

Although other configurations can be envisioned without departing from the scope of the present invention, in a preferred embodiment said band assembly comprises first substantially semi-circular band member 110 having outwardly extending connection flanges 112, and second substantially semi-circular band member 111 having outwardly extending connection flanges 113. Said first band member 110 and second band member 111 can be constructed of metal, and can be joined together with flanges 112 and 113 disposed in opposing relationship. In a preferred embodiment, said first band member 110 and second band member 111 are joined together using mating threaded bolts 120 disposed through aligned apertures in said flanges 112 and 113, and threaded nuts 121 (although other known fastening means such as, for example, band clamps or other mechanical fasteners can also be used to secure said first and second band members together).

At least one optional riser member 115 can be attached to first band member 110 or second band member 111. Said riser members 115 generally comprise support platforms that extend radially outward from the outer surface of said band members 110 and/or 111. In the embodiment depicted in FIG. 1, two riser members 115 are disposed on the outer surface of second band member 111; however, it is to be observed that the specific number, placement and configuration of said riser members 115 can be adjusted to meet particular operational or job parameters. Threaded studs or bolts 116 can extend radially outward from riser members 115, or directly from the outer surface of a band member (such as first band member 110, as depicted in FIG. 1).

Multidirectional runner body members 140 have at least one bore 141 for receiving a ball transfer assembly 130. Said runner body members 140 can be attached to band members 110 and/or 111 using threaded bolts 116 and mating threaded nuts; said multidirectional runner body members 140 can be attached to riser members 115, or directly to the outer surface of a band member (such as first band member 110, as depicted in FIG. 1). It is to be observed that the specific number, placement and configuration of said runner body members 140 can be adjusted to meet particular operational or other job parameters. In a preferred embodiment, said runner body members have an elongate wedge shape having tapered sides; said shape can also comprise a rectangular prism or a truncated triangular prism. Each of said ball transfer assemblies 130 generally comprises at least one ball bearing 132 rotatably disposed within a housing 131.

Figure 2:
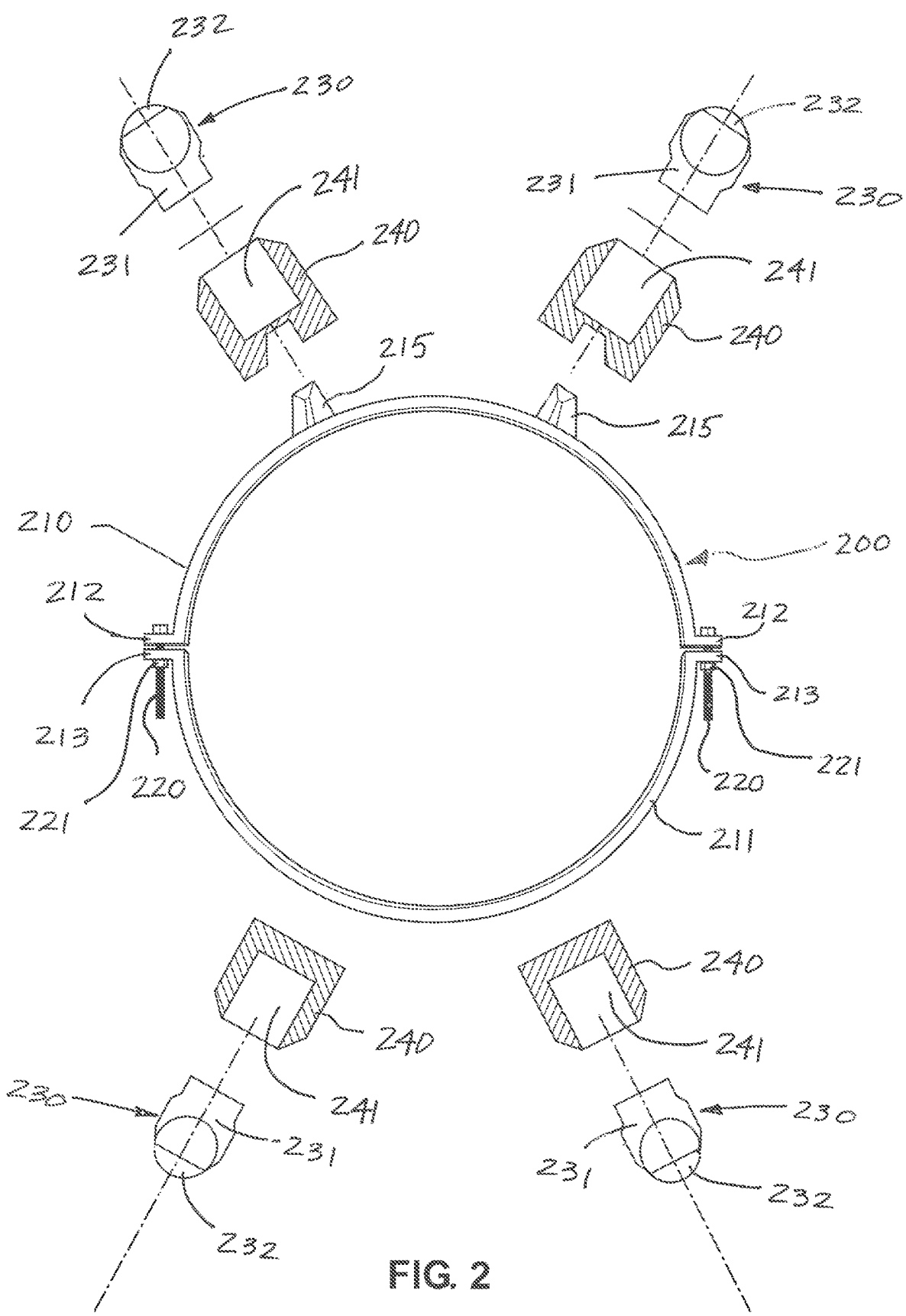

FIG. 2 depicts an exploded end view of a second embodiment of a multidirectional runner assembly 200 of the present invention. Although other configurations can be envisioned without departing from the scope of the present invention, in a preferred embodiment said band assembly comprises first substantially semi-circular band member 210 having outwardly extending connection flanges 212, and second substantially semi-circular band member 211 having outwardly extending connection flanges 213. Said first band member 210 and second band member 211 can be constructed of polyethylene and/or other synthetic material, and can be joined together with flanges 212 and 213 disposed in opposing relationship. In a preferred embodiment, said first band member 210 and second band member 211 are joined together using mating threaded bolts 220 disposed through aligned apertures in said flanges 212 and 213, and threaded nuts 221 (although other known fastening means such as, for example, band clamps or other mechanical fasteners can also be used to secure said first and second band members together).

At least one optional radial protrusion 215 can be attached to first band member 210 or second band member 211. Said radial protrusions 215 generally comprise protrusions or members that extend radially outward from the outer surface of said band members 210 and/or 211. In the embodiment depicted in FIG. 2, two radial protrusions 215 are disposed on the outer surface of second band member 211; however, it is to be observed that the specific number, placement and configuration of said radial protrusions 215 can be adjusted to meet particular operational or job parameters, and can be selectively disposed on one or both band members.

Multidirectional runner body members 240 have at least one bore 241 for receiving a ball transfer assembly 230. Said runner body members 240 can be attached to band members 210 and/or 211 using vulcanized welding to radial protrusions 215, adhesive(s), mechanical fastener(s) and/or combinations thereof. It is to be observed that the specific number, placement and configuration of said runner body members 240 can be adjusted to meet particular operational or other job parameters. Said ball transfer assemblies 230 generally comprise at least one ball bearing 232 rotatably disposed within a housing 231.

Figure 3:
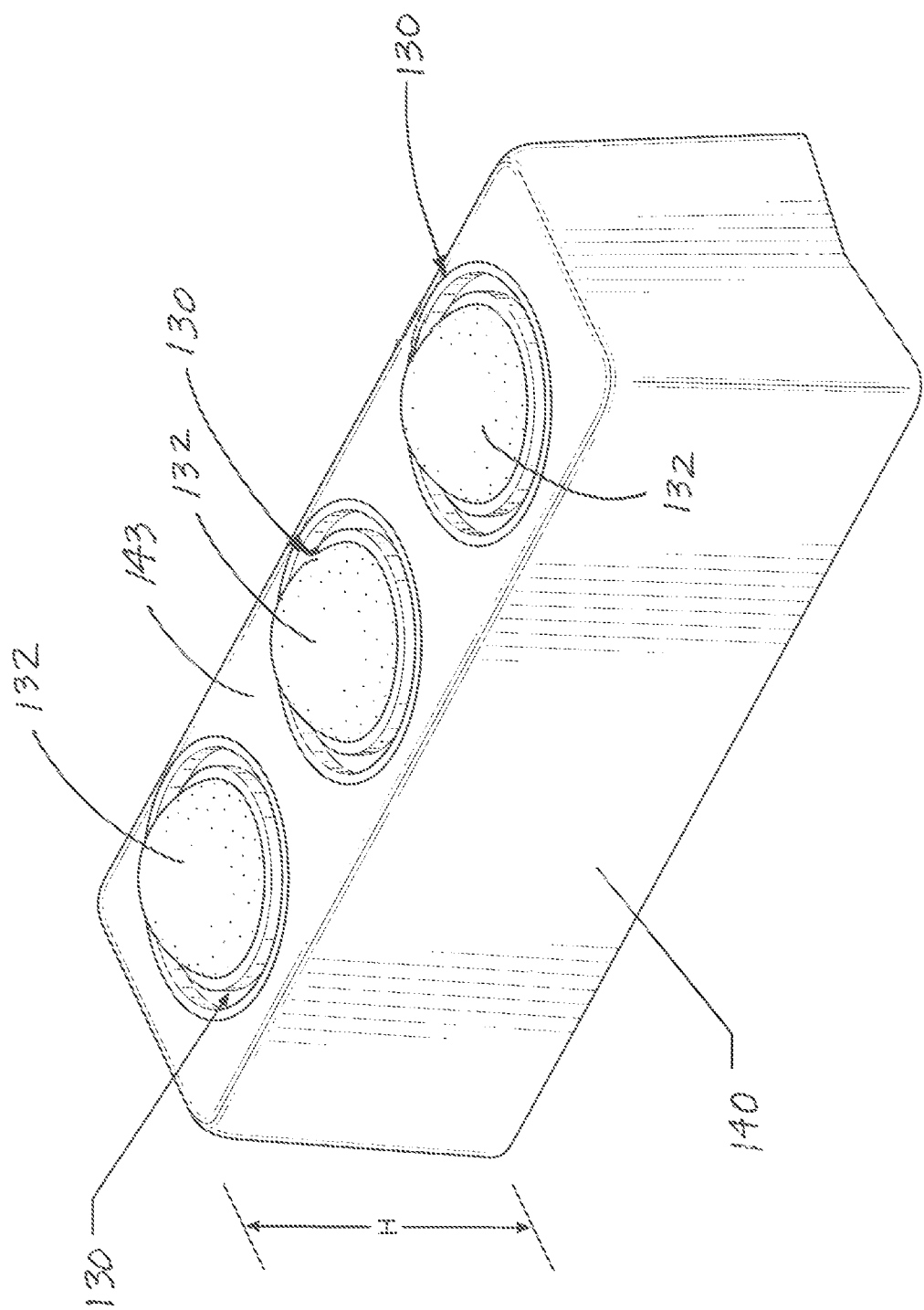
FIG. 3 depicts a perspective view of multidirectional roller assembly of the present invention.

FIG. 3 depicts a perspective view of multidirectional runner body member 140 of the present invention with a plurality of ball transfer assemblies 130 received and installed within bores 141, not visible in FIG. 3. It is to be observed that the specific number, placement and configuration of said ball transfer assemblies 130 can be adjusted to meet particular operational or other job parameters. Ball bearings 132 extend outward from runner body member 140 and protrude a desired distance beyond upper outer surface 143, thereby permitting said ball bearings 132 to contact the inner surface of a surrounding casing pipe. The height of runner body member 140 (depicted as dimension "H" in FIG. 3), the number and spacing of ball transfer assemblies 130, as well as the distance that ball bearings 132 protrude beyond upper outer surface 143, may be adjusted to meet particular operational and/or job parameters. As depicted in FIG. 3, multiple ball transfer assemblies 130 are disposed in axial alignment along the length of runner body member 140.

Figure 4:
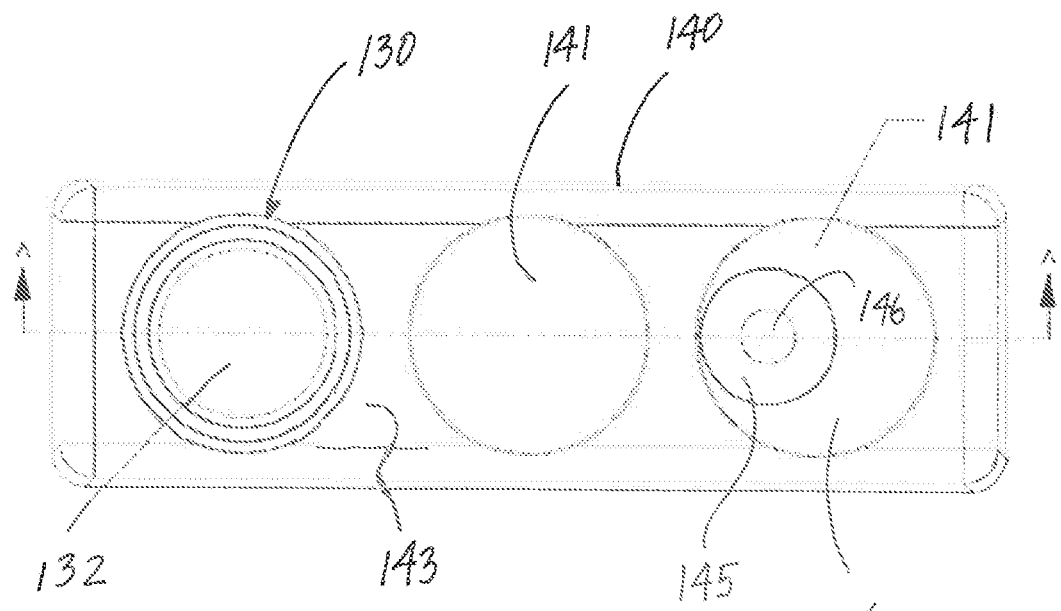
FIG. 4 depicts an overhead view of a partially disassembled multidirectional roller assembly of the present invention.

FIG. 4 depicts an overhead view of a partially disassembled multidirectional runner body member 140 of the present invention with a plurality of bores 141, and a single ball transfer assembly 130 received and installed within one of said bores 141. Ball bearing 132 of ball transfer assembly 131 extends outward from runner body member 140 and protrudes a desired distance beyond upper outer surface 143. As depicted in FIG. 4, a through bore 146 extends through the base of bore 141, while a countersunk recessed area 145 surrounds said bore 146.

Figure 5:
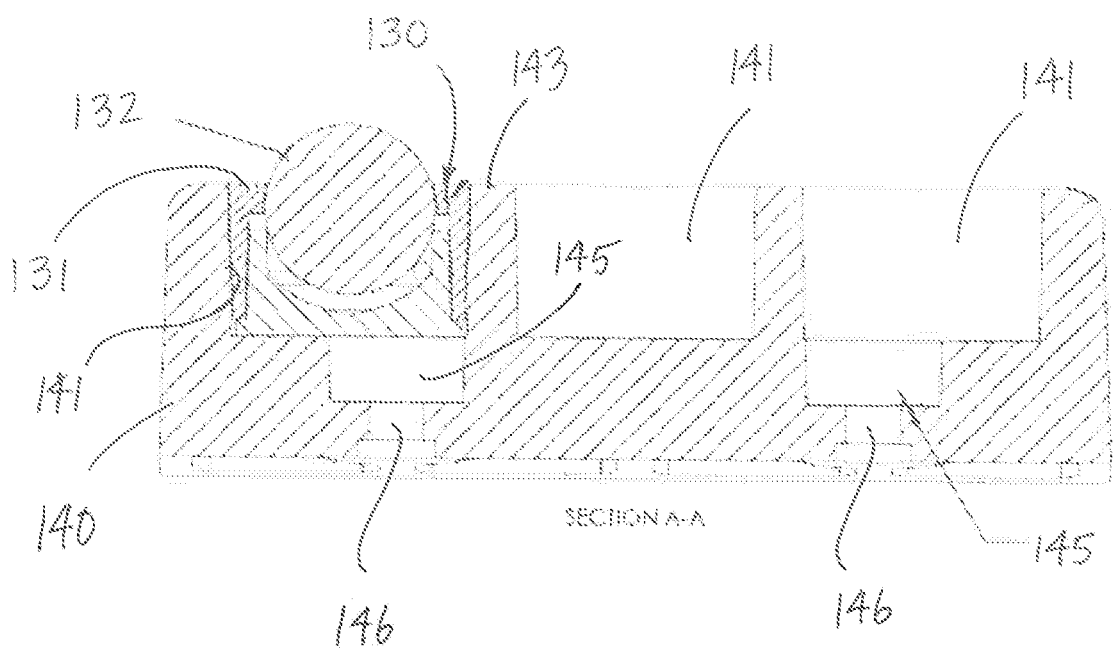
FIG. 5 depicts a side sectional view of multidirectional roller assembly of the present invention along line A-A of FIG. 4.

FIG. 5 depicts a side sectional view of said partially disassembled multidirectional runner body member 140 along line A-A of FIG. 4. The multidirectional runner body member 140 contains a ball transfer assembly 130, which can be secured in place within a bore 141 via frictional press fit, adhesive(s), over-molding, mechanical fastener(s) and/or combinations thereof. In a preferred embodiment, a through bore 146 extends through the base of at least one bore 141, while a countersunk recessed area 145 surrounds said bore(s) 146. Said countersunk recessed area 145 provides clearance to receive a drive socket of a socket or other tool used to turn a nut or other mechanical fastener disposed within said countersunk recessed area.

Ball transfer assemblies 130 and/or components thereof (such as, for example, ball bearing 132) can be formed from various materials including, without limitation, polymers and alloys, in order to accommodate particular operational and/or job parameters. Said ball transfer assemblies 130 can be numbered and/or spaced on said runner body member 140, and said runner body members 140 in turn can be numbered and/or spaced along the outer surface of a pipe, in order to maximize weight and/or load capacity.

The multidirectional runners of the present invention can comprise multiple ball transfers assemblies affixed to a single runner. Said ball transfer assemblies can be used on runners having different geometric structures, dimensions and/or configurations, while permitting various methods of mounting.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A multidirectional runner assembly for operational attachment to a length of carrier pipe comprising:
   a) a band member configured to be secured to an outer surface of a carrier pipe;
   b) a body section operationally attached to said band member, wherein said body section comprises an elongate member defining at least one outer surface, and wherein said at least one outer surface has at least one bore disposed therein; and
   c) a ball transfer assembly received within said at least one bore, wherein the position of said ball transfer assembly within said at least one bore can be adjusted so that said ball transfer assembly protrudes a predetermined distance beyond said at least one outer surface.

2. The multidirectional runner assembly of claim 1, wherein said ball transfer assembly is at least partially constructed of a polymer.

3. The multidirectional runner of claim 1, wherein said band member is at least partially constructed of metal or polyethylene.

4. A multidirectional runner assembly for operational attachment to a length of carrier pipe comprising:
   a) a band member configured to be secured to an outer surface of a carrier pipe;
   b) at least one elongate body member defining at least one outer surface, and wherein said at least one outer surface has a plurality of bores disposed therein; and
   c) a plurality of ball transfer assemblies received within said plurality of bores, wherein the positions of said plurality of ball transfer assemblies within said plurality of bores can be adjusted so that said ball transfer assemblies each protrude a predetermined distance beyond said at least one outer surface.

5. The multidirectional runner assembly of claim 4, wherein said ball transfer assembly is at least partially constructed of a polymer.

6. The multidirectional runner of claim 4, wherein said plurality of ball transfer assemblies is oriented in axial alignment parallel to the longitudinal axis of said elongate member.

7. The multidirectional runner of claim 4, wherein said band member is at least partially constructed of metal or polyethylene.

8. A method for installing a length of carrier pipe within the central bore of a casing, comprising:
   a) attaching a plurality of multidirectional runner assemblies to an outer surface of said carrier pipe, wherein each of said multidirectional runner assemblies comprises:
      i) a band member configured to be secured to an outer surface of a carrier pipe;
      ii) a plurality of elongate body members extending radially outward from said carrier pipe, wherein each of said elongate body members defines at least one outer surface, and wherein said at least one outer surface has a plurality of bores disposed therein; and
      (iii) a plurality of ball transfer assemblies received within said plurality of bores, wherein the positions of said plurality of ball transfer assemblies within said plurality of bores can be adjusted so that said ball transfer assemblies each protrude a predetermined distance beyond said at least one outer surface; and
   b) installing said carrier pipe and multidirectional runner assemblies within said central bore of said casing, wherein said multidirectional runner assemblies reduce frictional forces acting on said carrier pipe and prevent spiraling of said carrier pipe within said casing.

9. The method of claim 8, wherein said ball transfer assemblies are at least partially constructed of a polymer.

10. The method of claim 8, wherein said plurality of elongate body members is disposed in parallel orientation to the longitudinal axis of said carrier pipe.

11. The method of claim 8, wherein said plurality of ball transfer assemblies is oriented in axial alignment parallel to the longitudinal axis of said elongate member.

12. The method of claim 8, wherein said band member is at least partially constructed of metal or polyethylene.

\* \* \* \* \*